United States Patent
Ishikawa

(10) Patent No.: US 11,299,888 B2
(45) Date of Patent: Apr. 12, 2022

(54) LONG STRUCTURAL MEMBER AND STRUCTURAL MEMBER COMPLEX USING SAME

(71) Applicant: MITSUBISHI RAYON CO., LTD., Chiyoda-ku (JP)

(72) Inventor: Takeshi Ishikawa, Toyohashi (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/303,421

(22) PCT Filed: Apr. 13, 2015

(86) PCT No.: PCT/JP2015/061386
§ 371 (c)(1),
(2) Date: Oct. 11, 2016

(87) PCT Pub. No.: WO2015/159863
PCT Pub. Date: Oct. 22, 2015

(65) Prior Publication Data
US 2017/0030079 A1 Feb. 2, 2017

(30) Foreign Application Priority Data

Apr. 14, 2014 (JP) .............................. JP2014-082517

(51) Int. Cl.
*E04C 3/28* (2006.01)
*B62D 29/04* (2006.01)
(Continued)

(52) U.S. Cl.
CPC ............. *E04C 3/28* (2013.01); *B62D 25/00* (2013.01); *B62D 25/025* (2013.01); *B62D 25/08* (2013.01); *B62D 29/04* (2013.01)

(58) Field of Classification Search
CPC ............. E04C 3/28; E04C 2003/0473; E04C 2003/0465; B62D 25/00; B62D 25/025; B62D 25/08; B62D 29/04
(Continued)

(56) References Cited

U.S. PATENT DOCUMENTS 4,461,134 A * 7/1984 Lowe ..................... E04C 3/07
206/519
5,661,945 A * 9/1997 Henriksson ............ B23Q 1/015
52/239
(Continued)

FOREIGN PATENT DOCUMENTS

EP 1000678 A2 * 5/2000 ............. B21C 23/14
JP 8-13792 A 1/1996
(Continued)

OTHER PUBLICATIONS

Machine translation of Foreign reference EP 1000678 A2, obtained from http://translationportal.epo.org/emtp/translate/?ACTION=description-retrieval&COUNTRY=EP&ENGINE=google&FORMAT=docdb&KIND=A2&LOCALE=en_EP&NUMBER=1000678&OPS=ops.epo.org/3.2&SRCLANG=de&TRGLANG=en (last accessed on May 10, 2017).*

(Continued)

*Primary Examiner* — Theodore V Adamos
(74) *Attorney, Agent, or Firm* — Oblon, McClelland, Maier & Neustadt, L.L.P.

(57) ABSTRACT

A long structural member and a structural member complex that contain a fiber-reinforced resin having a simple reinforced structure, suppressing increase in molded article weight, and exhibiting high mechanical properties. The long structural member has a perpendicular cross-section formed in a U shape, has two of the corners on the inside of the U-shaped section reinforced by the fiber-reinforced resin, and has a triangular cross-section for each of the cross- (Continued)

sections of the two corners inside the reinforced U-shaped section.

9 Claims, 6 Drawing Sheets

(51) Int. Cl.
*B62D 25/02* (2006.01)
*B62D 25/00* (2006.01)
*B62D 25/08* (2006.01)

(58) Field of Classification Search
USPC .......... 52/844, 845, 831, 273, 63, 843, 846, 52/309.1
See application file for complete search history.

(56) References Cited

U.S. PATENT DOCUMENTS

| | | | |
|---|---|---|---|
| 6,168,226 B1 | 1/2001 | Wycech | |
| 6,453,635 B1* | 9/2002 | Turner | B29C 70/305 |
| | | | 403/359.6 |
| 6,729,094 B1* | 5/2004 | Spencer | E04B 5/10 |
| | | | 52/334 |
| 7,000,978 B1 | 2/2006 | Messano | |
| 7,228,672 B2* | 6/2007 | Hayes | B29C 70/52 |
| | | | 52/843 |
| 7,861,489 B2* | 1/2011 | Ueno | B21D 26/059 |
| | | | 52/79.8 |
| 2004/0139684 A1* | 7/2004 | Menendez | E04C 3/07 |
| | | | 52/831 |
| 2007/0095002 A1* | 5/2007 | Kim-Whitty | E04C 3/07 |
| | | | 52/844 |
| 2008/0016816 A1* | 1/2008 | Kim | E04C 3/06 |
| | | | 52/633 |
| 2009/0113827 A1* | 5/2009 | Stone | E04C 3/07 |
| | | | 52/846 |
| 2009/0178360 A1* | 7/2009 | Teffenhart, Jr. | E04C 3/06 |
| | | | 52/650.1 |
| 2010/0281821 A1* | 11/2010 | Frobosilo | E04C 3/09 |
| | | | 52/846 |
| 2011/0059276 A1* | 3/2011 | Winkler | E04B 1/943 |
| | | | 428/34.1 |
| 2011/0067332 A1* | 3/2011 | Plagemann | B29C 70/52 |
| | | | 52/309.13 |
| 2012/0233961 A1* | 9/2012 | Matos | E04C 3/07 |
| | | | 52/846 |
| 2013/0174512 A1* | 7/2013 | Gallagher, Jr. | C22C 38/12 |
| | | | 52/846 |
| 2014/0322484 A1 | 10/2014 | Teshima et al. | |
| 2015/0225953 A1* | 8/2015 | Dorman | E04C 3/04 |
| | | | 52/844 |

FOREIGN PATENT DOCUMENTS

| | | |
|---|---|---|
| JP | 2003-278381 A | 10/2003 |
| JP | 2010-527813 A | 8/2010 |
| JP | 2010-221487 A | 10/2010 |
| JP | 2013-933 A | 1/2013 |
| JP | 2013-52851 A | 3/2013 |
| JP | 2014-4728 A | 1/2014 |
| JP | 2014-54798 A | 3/2014 |
| WO | WO 2008/147176 A1 | 12/2008 |
| WO | 2013/080975 A1 | 6/2013 |

OTHER PUBLICATIONS

International Search Report dated Jul. 7, 2015, in PCT/JP2015/061386 filed Apr. 13, 2015.
Office Action dated Feb. 16, 2016, in Japanese Patent Application No. 2015-520455 ( with English Translation), (6 Pages).
Extended European Search Report dated Apr. 20, 2017 in Patent Application No. 15779669.9.
Office Action as received in the corresponding IN Patent Application No. 201647034189 dated May 31, 2019 w/English Translation.

\* cited by examiner

LONG STRUCTURAL MEMBER AND STRUCTURAL MEMBER COMPLEX USING SAME

TECHNICAL FIELD

The present invention relates to a structure member formed of fiber reinforcement resin and called a hat channel including flanges and an elongated main body formed to have a U-shaped cross-section orthogonal to an axis and also relates to a structural member complex having a closed cross-sectional shape formed by bonding flange portions of the plurality of hat channels.

Priority is claimed on Japanese Patent Application No. 2014-82517, filed on Apr. 14, 2014, the content of which is incorporated herein by reference.

BACKGROUND ART

An elongated member that is a structure member formed of fiber reinforcement resin and is called a hat channel including a U-shaped cross-section and flanges and a structure member (a structural member complex) having a closed cross-sectional shape formed by bonding flange portions of the plurality of hat channels are well known. For example, Patent Document 1 discloses an effect of a rib for improving the strength of a hat channel. Further, Patent Document 2 discloses a method of reinforcing a hat channel formed of non-continuous fiber by the use of tape-shaped continuous fiber reinforcement resin.

It is effective to provide a rib structure at the inside of the hat channel in order to improve the bending strength of the hat channel as disclosed in Patent Document 1. However, since the rib structure is complex, a problem arises in that a molding operation is difficult and an increase in weight occurs. Further, when an actual bending test is performed, stress concentrates on the rib portion due to a difference in stiffness in accordance with the existence of the rib in the rib structure disclosed in, for example, Patent Document 1. As a result, a problem arises in that the rib portion is noticeably broken.

It is effective to distribute stress by increasing the number of the ribs in order to suppress the stress concentrated on the rib portion. However, when such a structure is selected, the structure of the hat channel becomes further complex. As a result, the rib portion is not easily molded and the weight of a molded article increases.

CITATION LIST

Patent Document

Patent Document 1: JP 2013-933 A
Patent Document 2: JP 2014-54798 A

SUMMARY OF THE INVENTION

Problem to be Solved by the Invention

The invention is made in view of the above-described circumstances and an object of the invention is to provide a hat channel type structure member formed by fiber reinforcement resin to have a simple reinforcement structure and to exhibit high mechanical characteristics while suppressing an increase in molded article weight.

Means for Solving Problem

The present inventors have accomplished the invention by carefully examining the above-described problems. That is, the invention has the following points (1) to (8).

(1) A long structural member formed to have a U-shaped longitudinal cross-section and formed such that two corners inside the U-shaped portion are reinforced by fiber reinforcement resin and a cross-section of each of two corners inside the reinforced U-shaped portion is a triangular cross-section satisfying the following equations:

$$0.05 \leq W/W0 \leq 0.15$$

$$0.15 \leq H/H0 \leq 0.36, \text{ in which}$$

W0 indicates an outer face length of a bottom face portion of the U-shaped portion of the longitudinal cross-section, W indicates an inner face length of the bottom face portion of the U-shaped portion of the inner corner of the reinforced U-shaped portion of the longitudinal cross-section, H0 indicates an outer face length of the upright face portion of the U-shaped portion of the longitudinal cross-section, and H indicates an inner face length of the upright face portion of the U-shaped portion of the inner corner of the reinforced U-shaped portion of the longitudinal cross-section.

(2) The long structural member according to (1), wherein a side edge facing the inside of the U-shaped portion in the cross-section of the corner is linear.

(3) The structural member according to (1) or (2), wherein matrix resin forming the fiber reinforcement resin is thermoplastic resin.

(4) The structural member according to (1) or (2), wherein matrix resin forming the fiber reinforcement resin is thermosetting resin.

(5) The structural member according to (1) or (2), wherein reinforcement fiber forming the fiber reinforcement resin is carbon fiber or glass fiber.

(6) The long structural member according to any one of (1) to (5), wherein a pair of flanges extending in a longitudinal direction are formed at both end portions of the long structural member extending in the longitudinal direction.

(7) A structural member complex having a closed cross-sectional shape formed by bonding both end portions extending in a longitudinal direction in two long structural members according to any one of (1) to (5).

(8) A structural member complex having a closed cross-sectional shape formed by bonding two flanges of two long structural members according to (6).

Effect of the Invention

According to the invention, it is possible to provide a fiber reinforcement resin structure member having a simple reinforcement structure and exhibiting high mechanical characteristics including a bending strength or a flexural modulus while suppressing an increase in molded article weight.

MODE(S) FOR CARRYING OUT THE INVENTION

Hereinafter, an embodiment of the invention will be described in detail.

Figure 1A:
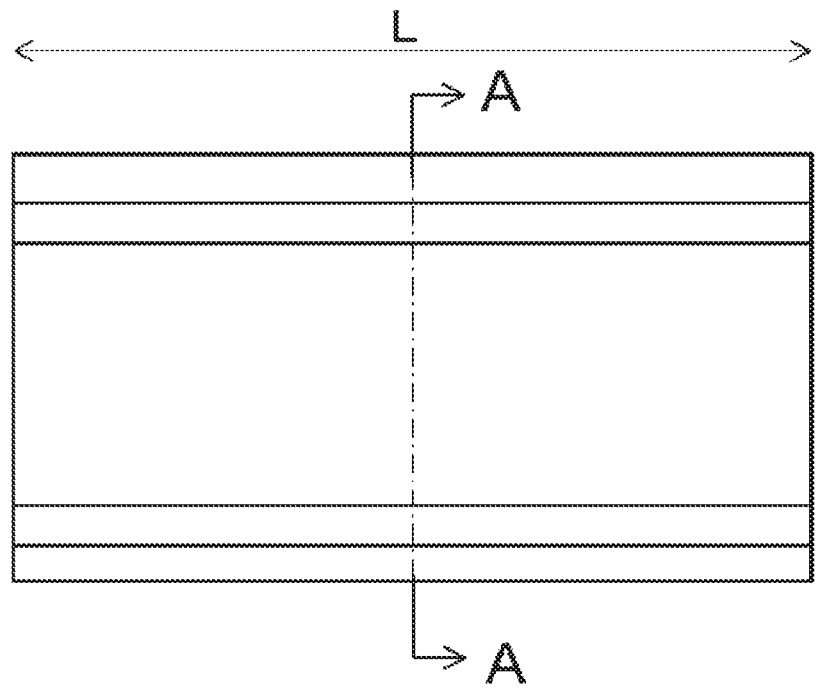
FIG. 1A is a view illustrating an example of a long structural member of an embodiment of the invention.
Figure 1B:
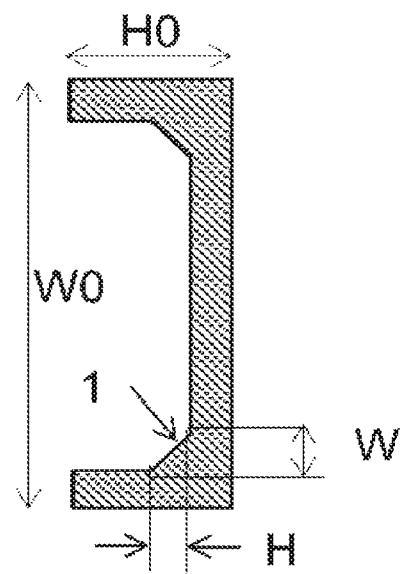
FIG. 1B is a view in a cross-section orthogonal to an axis (side cross-section) of the long structural member of FIG. 1A.

A fiber reinforcement resin molded article of the embodiment is a long structural member that is formed to have a U-shaped longitudinal cross-section. The elongated shape mentioned herein is a structure of which a dimension (L in FIG. 1A) in one direction (the longitudinal direction) is longer than any one of a dimension (W0 in FIG. 1B) in the width direction and a dimension (H0 in FIG. 1B) in the height direction. Here, the dimension L in the longitudinal direction is desirably 1.5 times or more and further desirably 2 times or more the dimension W0 in the width direction. As the elongated shape, for example, a part of a pipe shape, a rail shape, or a cord shape can be exemplified. More specifically, for example, a structure member illustrated in FIGS. 1A and 1B is exemplified. Further, in the U-shaped cross-section, a cross-section perpendicular to the longitudinal direction (a cross-section orthogonal to an axis to be described later), for example, at least a part of a cross-section in the width direction is formed in a U shape. For example, in the embodiment, the cross-section indicates a cross-section taken along the line A-A in FIG. 1A and the cross-section is formed in a U shape as illustrated in FIG. 1B. More specifically, for example, the U shape is a shape which includes a bottom face (having a dimension W0 in the width direction in FIG. 1B) and an upright face (having a dimension H0 in the height direction in FIG. 1B) extending from each of both ends of the bottom face in the height direction.

Further, in the description below, the facing sides of the upright faces in the extension direction from the bottom face to the upright face in the long structural member will be referred to as the inside of the U shape and the opposite sides will be referred to as the outside in the U shape.

Further, in the embodiment, it is desirable that two corners at the inside of the U-shaped portion of the long structural member be reinforced by fiber reinforcement resin and the cross-section of each of two corners at the inside of the reinforced U-shaped portion be a triangular cross-section satisfying the following equations.

$0.05 \leq W/W0 \leq 0.15$ $0.15 \leq H/H0 \leq 0.36$

W0 indicates the outer face length of the bottom face portion of the U-shaped portion in the cross-section orthogonal to the axis of the long structural member.

W indicates the inner face length of the bottom face portion of the U-shaped portion of the inner corner of the reinforced U-shaped portion in the cross-section orthogonal to the axis of the long structural member.

H0 indicates the outer face length of the upright face portion of the U-shaped portion in the cross-section orthogonal to the axis of the long structural member.

H indicates the inner face length of the upright face portion of the U-shaped portion of the inner corner of the reinforced U-shaped portion in the cross-section orthogonal to the axis of the long structural member.

The "cross-section orthogonal to the axis" of the embodiment indicates a plane (a cross-section taken along the line A-A in FIG. 1A) which is orthogonal to the axial direction (the longitudinal direction) of the long structural member and is perpendicular to the bottom face of the U-shaped portion. An "elongated main body" which is formed to have a U-shaped cross-section orthogonal to the axis of the embodiment indicates so-called bottom and upright faces. For example, in the example illustrated in FIG. 3, the elongated main body includes a bottom face 3 and upright faces 4. In the embodiment, it is desirable that a pair of flanges 6 be formed at both end portions of the elongated main body including the bottom face 3 and the upright faces 4 to extend in the longitudinal direction from the viewpoint of whether a structure member having a closed cross-sectional shape can be easily formed by two long structural members molded in a U shape. Both end portions of the elongated main body indicate both end portions 5 of FIG. 3 and are depicted as protrusions in FIG. 3.

In the long structural member of the embodiment, two corners located at the inside of the U-shaped portion of the structure (the corner 2 and the opposite corner in FIG. 2) are reinforced by fiber reinforcement resin. The "reinforcement" mentioned herein indicates, for example, a state where the thickness of the corner 2 is larger than the thickness of the other portion of the structure member. For example, the average thickness of the corner 2 is larger than any one of the average thickness of the bottom face 3 and the average thickness of the upright face 4 in FIG. 3. The average thickness is obtained in such a manner that thicknesses are measured at a plurality of points (2 to 5) near the center portion and the end portion and an average is obtained. Hereinafter, a portion which is formed by fiber reinforcement resin in order to thicken the corner 2 will be also referred to as a corner reinforcement structure. Then, the effect of the embodiment can be exhibited when the cross-section of each of two corners 2 at the inside of the reinforced U-shaped portion is within the range of $0.05 \leq W/W0 \leq 0.15$ and $0.15 \leq H/H0 \leq 0.36$ and has a triangular cross-section. When the ratio W/W0 is smaller than 0.05, the reinforcement effect is not enough. On the contrary, when the ratio is larger than 0.15, the weight of the molded article increases. Similarly, when the ratio H/H0 is smaller than 0.15, the reinforcement effect is not enough. On the contrary, when the ratio is larger than 0.36, the weight of the molded article increases.

In order to ensure the reinforcement effect and to suppress an increase in molded article weight, the ratio W/W0 is desirably equal to or larger than 0.05 and equal to or smaller than 0.15 and is further desirably equal to or larger than 0.06 and equal to or smaller than 0.14. In order to ensure the reinforcement effect and to suppress an increase in molded article weight, the ratio H/H0 is desirably equal to or larger than 0.15 and equal to or smaller than 0.36 and is further desirably equal to or larger than 0.16 and equal to or smaller than 0.35. Further, as another embodiment different from the embodiment, a range of 0.05≤W/W0≤0.15 or 0.06≤W/W0≤0.14 and a range of 0.15≤H/H0≤0.36 or 0.16≤H/H0≤0.35 may be selected.

A side edge facing the inside of the U-shaped portion in the cross-section of the corner 2 (a long side edge in the corner of the corner reinforcement structure) may be linear or curved (for example, a curve or circular-arc shape having a rounded portion). In the case of the curve or circular-arc shape having a rounded portion, it is desirable that a radius R be larger than W0 of 0.01 and H0 of 0.01. When the radius R is smaller than W0 of 0.01 or H0 of 0.01, an enough reinforcement effect cannot be obtained. Further, as another embodiment different from the embodiment, the radius R may be larger than W0 of 0.05 and H0 of 0.05.

Figure 4A:
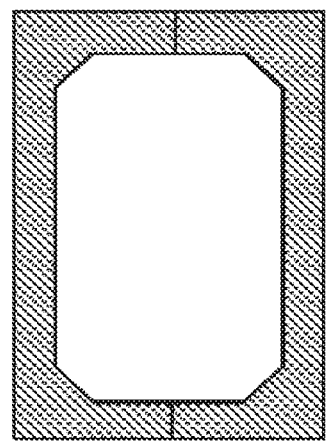
FIG. 4A is a view in a cross-section orthogonal to an axis of a structural member complex having a closed cross-sectional shape formed by bonding two ends of two long structural members.
Figure 4B:
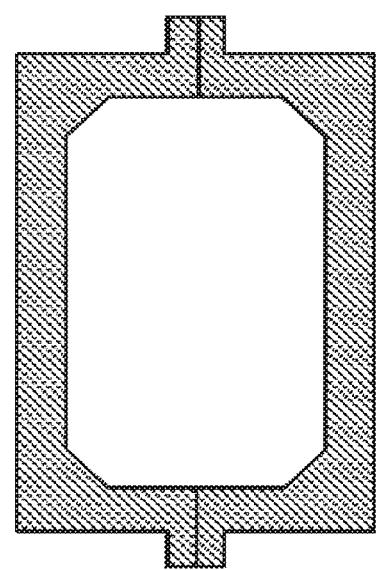
FIG. 4B is a view in a cross-section orthogonal to an axis of a structural member complex different from FIG. 4A and having a closed cross-sectional shape formed by bonding two flange portions of two long structural members.

Further, as another embodiment different from the embodiment, it is possible to obtain a structure member having a closed cross-sectional shape by bonding both end portions extending in the longitudinal direction in two long structural members as illustrated in FIG. 4A and to obtain a structure member having a closed cross-sectional shape by bonding two flange portions (or both end portions or flange portions) of two long structural members as illustrated in FIG. 4B. These structure members may be bonded to each other by any method, but when the fiber reinforcement resin forming the structure member is fiber reinforcement thermoplastic resin, vibration bonding, ultrasonic bonding, or an adhesive can be used. Further, in the case of fiber reinforcement thermosetting resin, an adhesive or an adhesive tape can be used.

[Fiber Reinforcement Thermoplastic Resin Molded Article]

Figure 3:
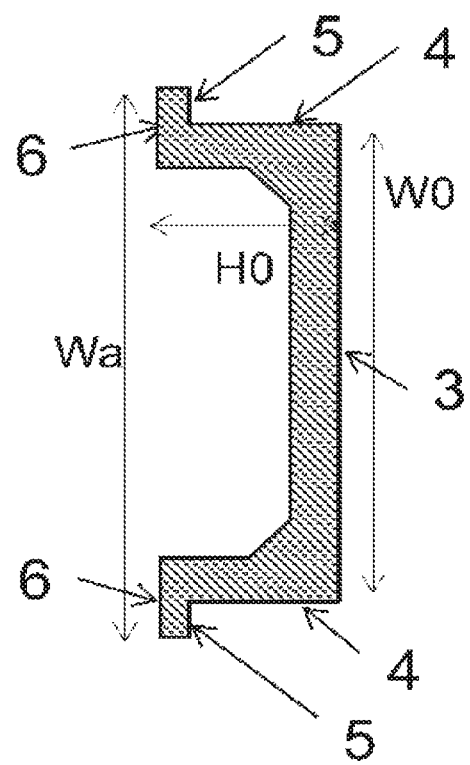
FIG. 3 is an example of a view in a cross-section orthogonal to an axis of a long structural member of the embodiment of the invention.

A molded article illustrated in FIG. 3 is a long structural member that includes a U-shaped cross-section called a hat channel and flanges and is designed to have, for example, strong physical properties against bending deformation in the width direction or the height direction. For this configuration, a rib structure is generally provided inside the long structural member to increase cross-sectional secondary moment. However, since the bottom face 3 (FIG. 3) is bent or the upright face 4 (FIG. 3) is inclined in a complex manner due to the bending deformation of the long structural member, there is need to appropriately design the cross-section in consideration of factors other than the cross-sectional secondary moment.

In the long structural member of the embodiment, since the corner reinforcement structure is provided to reinforce the inside of the corner 2 of the long structural member as illustrated in FIGS. 1A and 1B differently from the general rib structures illustrated in FIGS. 5A, 5B, 6A, and 6B, the bending strength can be further effectively improved.

The cross-section of the corner reinforcement structure has a shape in which a position separated from the bottom face by a length H in the upright face is connected to a position separated from the upright face by a length W in the bottom face through a line as illustrated in FIG. 1B and is continuous in the elongated direction (the longitudinal direction) as illustrated in FIG. 1A. Further, as illustrated in FIG. 2, the position separated from the bottom face by the length H in the upright face may be connected to the position separated from the upright face by the length W in the bottom face through a curve (a circular-arc).

Figure 2:
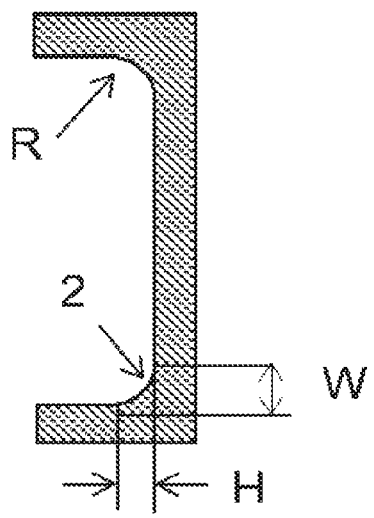
FIG. 2 is an example of a view in a cross-section being orthogonal to an axis of a long structural member of the embodiment of the invention.

The size of the corner reinforcement structure is determined by the width W (the inner face length of the bottom face portion of the U-shaped portion of the inner corner of the reinforced U-shaped portion in the cross-section orthogonal to the axis of the long structural member) and the height H (the inner face length of the upright face portion of the U-shaped portion of the inner corner of the reinforced U-shaped portion in the cross-section orthogonal to the axis of the long structural member) illustrated in FIGS. 1A, 1B, and 2, but when both W and H are set to be small, an increase in weight of the elongated structure can be suppressed. In the case of the long structural member of which the W0 (the outer face length of the bottom face portion of the U-shaped portion in the cross-section orthogonal to the axis of the long structural member) illustrated in FIG. 1B is large, the bottom face is bent during the bending deformation (for example, in the width direction or the height direction) and thus bending strength is deteriorated. In order to suppress this problem, it is effective to increase the W. It is desirable that the W be equal to or larger than W0 of 0.05 and equal to or smaller than W0 of 0.15. Further, in the case of the long structural member in which the H0 (the outer face length of the upright face portion of the U-shaped portion in the cross-section orthogonal to the axis of the long structural member) illustrated in FIG. 1B is large, the upright face is inclined and thus bending strength is deteriorated. In order to suppress this problem, it is desirable to increase the H. It is desirable that the H is equal to or larger than H0 of 0.15 and equal to or smaller than H0 of 0.36.

Specifically, the values W0, H0, W, and H may be respectively, for example, 10 to 500 mm, 5 to 300 mm, 1.0 to 75, and 1.0 to 100.

It is desirable that the corner reinforcement structure be continuous in the longitudinal direction in that stress concentration is not caused even when the bending deformation occurs at an arbitrary position. For example, it is desirable that the corner reinforcement structure include a portion having a size of 80 to 100% with respect to the size of the long structural member in the longitudinal direction. Further, when the values W and H in the cross-sectional shape of the corner reinforcement structure are within the above-described range, the cross-sectional shape does not need to be uniform and may be different due to a portion in the longitudinal direction. In that case, the cross-sectional shape may be continuously changed due to a portion in the longitudinal direction.

In the embodiment, an angle of an outer face corner formed by the outer face of the upright face and the bottom face of the U-shaped portion in the cross-section orthogonal to the axis of the long structural member is substantially perpendicular and is allowed in the range of about 85 to 95° from the viewpoint of strength. When this angle is too large or small, the strength of the long structural member is deteriorated. Further, it is desirable to fill the reinforcement fiber resin to the outer face corner from the viewpoint of the strength of the long structural member.

The long structural member of the embodiment may be a structure member having a closed cross-sectional shape formed by bonding both end portions of two long structural members extending in the longitudinal direction or a structure member having a closed cross-sectional shape formed by bonding two flange portions and/or end portions of two long structural members. This bonding method is not particularly limited, but thermal bonding, vibration bonding, or ultrasonic bonding can be exemplified. Various adhesives, various adhesive tapes, rivets, or bolts may be used for the bonding. In this way, a structure including a plurality of long structural members is called a structural member complex. Further, the structural member complex is formed by bonding the plurality of long structural members through the above-described methods, but the members formed by the combination of the plurality of long structural members may be integrally molded.

The long structural member of the embodiment may be coupled (bonded) to a member other than the long structural member through flange portions and/or both end portions or the other portions. As such members, metal is generally used. Then, various adhesives, various adhesive tapes, rivets, or bolts may be used in the coupling (bonding) method.

The fiber reinforcement resin can be desirably used in the long structural member of the embodiment. Since the fiber reinforcement resin has high rigidity and large breaking strength, the fiber reinforcement resin can be desirably used in the long structural member of the embodiment.

As the reinforcement fiber forming the fiber reinforcement resin used in the long structural member of the embodiment, inorganic fiber, organic fiber, metallic fiber, or hybrid reinforcement fiber obtained by the combination thereof can be used although the type of reinforcement fiber is not particularly limited. As the inorganic fiber, carbon fiber, graphite fiber, silicon carbide fiber, alumina fiber, tungsten carbide fiber, boron fiber, or glass fiber can be exemplified. As the organic fiber, aramid fiber, or high-density polyethylene fiber can be exemplified. Alternatively, general nylon fiber or polyester can be exemplified. As the metallic fiber, stainless steel or iron fiber can be exemplified. Alternatively, carbon fiber coated with metal may be used. As the reinforcement fiber, carbon fiber is desirable in consideration of mechanical characteristics including strength of a final molded article among these examples. Further, an average fiber diameter of the reinforcement fiber is desirably 1 to 50 μm and further desirably 5 to 20 μm. Here, the average fiber diameter of the reinforcement fiber is a value measured by a micrometer or a microscope. It is desirable that the diameter of the reinforcement fiber be in the range of 1 to 50 μm.

It is desirable that the average fiber length of the reinforcement fiber be 5 mm or more. Here, the average fiber length of the reinforcement fiber indicates a value obtained in such a manner that matrix resin is burned to extract only the reinforcement fiber and the reinforcement fiber is observed and measured by a microscope. Further, the reinforcement fiber may be measured by an image analysis such as an X-ray CT analysis. It is desirable that the length of the reinforcement fiber be 5 mm or more. The length of the reinforcement fiber is not particularly limited, but is generally equal to or smaller than the length of the long structural member due to the limitation of the length of the long structural member. It is desirable that the content of the reinforcement fiber in the reinforcement fiber resin be 5 to 80 mass % with respect to the entire mass of the reinforcement fiber resin.

As the matrix resin forming the fiber reinforcement resin used in the long structural member of the embodiment, thermoplastic resin is desirable although the type of resin is not particularly limited. As such thermoplastic resin, polyamide (nylon 6 or nylon 66), polyolefin (polyethylene or polypropylene), modified polyolefin, polyester (polyethylene terephthalate or polybutylene terephthalate), polycarbonate, polyamideimide, polyphenylene oxide, polysulfone, polyether sulfone, polyether ether ketone, polyetherimide, polystyrene, ABS, polyphenylene sulfide, liquid crystal polyester, or copolymer of acrylonitrile and stylene can be used. Further, a mixture may be used as the matrix resin. As the matrix resin, copolymer nylon of nylon 6 and nylon 66 may be used. Further, flame retardant, weather resistance improver, antioxidant, heat stabilizer, ultraviolet light absorbent, plasticizer, lubricant, colorant, compatibilizer, or conductive filler may be added to the fiber reinforcement resin in response to the desired characteristics of the molded article.

As the matrix resin forming the fiber reinforcement resin used in the hat channel type structure of the embodiment, thermosetting resin may be used although the type of resin is not particularly limited. As such thermosetting resin, epoxy resin, acrylic resin which is radical polymerization resin, or phenol resin can be exemplified. Further, flame retardant, weather resistance improver, antioxidant, heat stabilizer, ultraviolet light absorbent, plasticizer, lubricant, colorant, compatibilizer, or conductive filler may be added to the matrix resin in response to the desired characteristics of the molded article.

The hat channel type structure of the embodiment is suitably used in, for example, an automobile component such as a front sub-frame, a rear sub-frame, a front pillar, a center pillar, a side member, a cross member, a side sill, a roof rail, or a propeller shaft, an underwater pipe, a cable core, a printing roll/pipe, a robot fork, or a primary structure member or a secondary structure member of an airplane.

<Elongated Structure Forming Method>

The long structural member forming method is not particularly limited, but for example a following method can be exemplified. A method is exemplified in which sheet-shaped fiber reinforcement resin including non-continuous fiber in resin or film-shaped fiber reinforcement resin including matrix resin and continuous fiber in one direction and laminated in a sheet shape is heated by an infrared heater or the like until the matrix resin is melted and is press-molded by a mold having a temperature lower than the fiber reinforcement resin melting temperature. As the mold, a mold molded according to the inner shape of the U-shaped portion of the long structural member is used. Specifically, an elongated mold having dimensions of about a width W0, a height H0, and a length equal to or larger than L and having a corner chamfered according to dimensions of a height H and a width W is used. At this time, the fiber may be disposed in the reinforced corner toward the longitudinal direction of the long structural member. The long structural member can be formed by injection-molding a pellet-shaped material. At this time, the pellet-shaped material may include non-continuous reinforcement fiber. Further, the injection-molding operation may be performed after the fiber reinforcement resin sheet having fiber disposed in the longitudinal direction of the long structural member is charged on the reinforced corner in advance. In the injection molding condition, a cylinder temperature of an injection molding machine is desirably set to a cylinder temperature equal to or larger than 10° C. and equal to or smaller than 100° C. in the fiber reinforcement resin melting temperature and a mold temperature is desirably lower than the fiber reinforcement resin solidification temperature by 10° C. to 200° C. in accordance with the type of fiber reinforcement resin.

EXAMPLES

Elongated Structure Forming Method

A shape was generated on a computer by the use of ProEngineer (Wildfire 4.0) corresponding to three-dimensional CAD software.

(Formation of Structure Formed by Bonding Elongated Structures)

A structure member having a closed cross-section was formed by completely bonding two flange faces and/or both cross-sections of two long structural members on the CAD (FIG. 4B).

(Mass Evaluation Method)

Mass was calculated by the use of ProEngineer (Wildfire 4.0) corresponding to three-dimensional CAD software. At that time, a mass ratio with respect to a structure member without a rib as a reinforcement countermeasure was calculated. Then, Evaluation A was given when a mass ratio obtained by dividing the mass of the reinforced long structural member by the non-reinforced long structural member was smaller than 1.3 and Evaluation B was given in the other cases.

(Evaluation of Bending Characteristic)

Figure 7A:
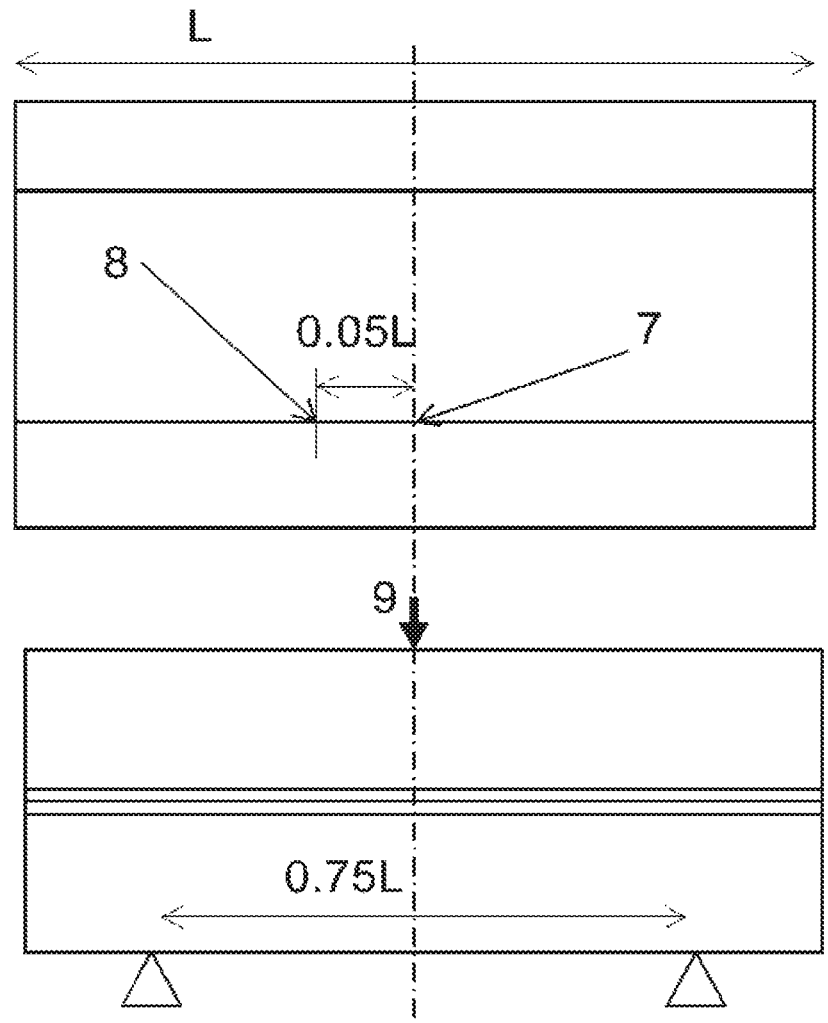
FIG. 7A is a view illustrating a CAE analysis method.
Figure 7B:
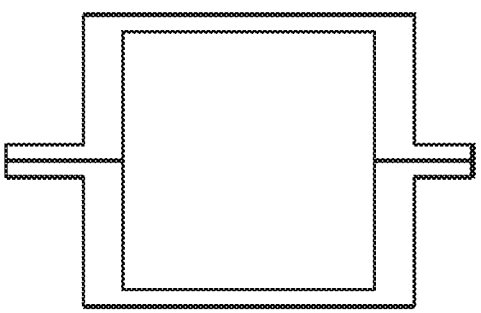
FIG. 7B is a cross-sectional view illustrating a structure member used in the CAE analysis of FIG. 7A.

A CAE analysis for three-point bending was performed by the use of a Mechanical function of ProEngineer (Wildfire 4.0) corresponding to three-dimensional CAD software. At that time, a three-point bending test was expressed in such a manner that the displacement and the rotation of two lines on the bottom face at a target point distance 300 mm (0.75 times L of 400 mm to be described later) were fixed and the center line of the opposite bottom face was displaced by 1 mm (FIGS. 7A and 7B). As the material properties, an elastic modulus of 40 GPa of carbon fiber of 45 vol % was used. Then, a static analysis was performed by the boundary condition and Mises stress and displacement were extracted from the line along the corner on the bottom face from the result.

As a result, Evaluation A was given when a value (a stress ratio) obtained by dividing a maximal value of the Mises stress by the structure member without the rib corresponding to a reinforcement countermeasure was equal to or smaller than 1.0 and Evaluation B was given in the other cases. In this way, a stress concentration suppression degree was evaluated. As for the displacement, a displacement value was obtained at a position of 20 mm (0.05 times L of 400 mm to be described later) from the center. Then, Evaluation A was given when a value (a displacement ratio) obtained by dividing the displacement by the displacement of the structure member without the rib corresponding to a reinforcement countermeasure is equal to or larger than 1.0 and Evaluation B was given in the other cases. In this way, a displacement concentration suppression degree at a load position was evaluated.

Example 1

A long structural member (FIG. 3) without a rib corresponding to a reinforcement countermeasure was formed to have a thickness of 2 mm, L of 400 mm, Wa of 72.4 mm, W0 of 52.4 mm, and H0 of 25 mm by the use of CAD software and flange faces of two long structural members were bonded to form a structure member (a structural member complex). After the mass of the structure member was calculated, a CAE analysis was performed to calculate a stress value and a displacement value.

Next, a long structural member was formed to have a thickness of 2 mm, L of 400 mm, Wa of 72.4 mm, W0 of 52.4 mm, and H0 of 25 mm, a corner reinforcement (FIG. 1B) was formed at the inside of the long structural member on the CAD so that W was 7 mm, H was 7 mm, and a long side edge was linear, and the flange faces of two long structural members were bonded to form a structure member (a structural member complex) having a closed cross-sectional shape. After the mass of the structure member was calculated, a CAE analysis was performed to calculate a stress value and a displacement value and a mass ratio, a stress ratio, and a displacement ratio were obtained by the division of the case without the corner reinforcement. As a result, Evaluation A was given in the mass ratio of 1.22, Evaluation A was given in the stress ratio of 0.87, and Evaluation A was given in the displacement ratio of 1.07.

Example 2

An evaluation was performed similarly to Example 1 except that a corner reinforcement had a width W of 5 mm and a height H of 5 mm. As a result, Evaluation A was given in the mass ratio of 1.10, Evaluation A was given in the stress ratio of 0.98, and Evaluation A was given in the displacement ratio of 1.05.

Example 3

An evaluation was performed similarly to Example 1 except that a corner reinforcement had a width W of 5 mm and a height H of 9 mm. As a result, Evaluation A was given in the mass ratio of 1.21, Evaluation A was given in the stress ratio of 0.99, and Evaluation A was given in the displacement ratio of 1.06.

Comparative Example 1

Figure 5A:
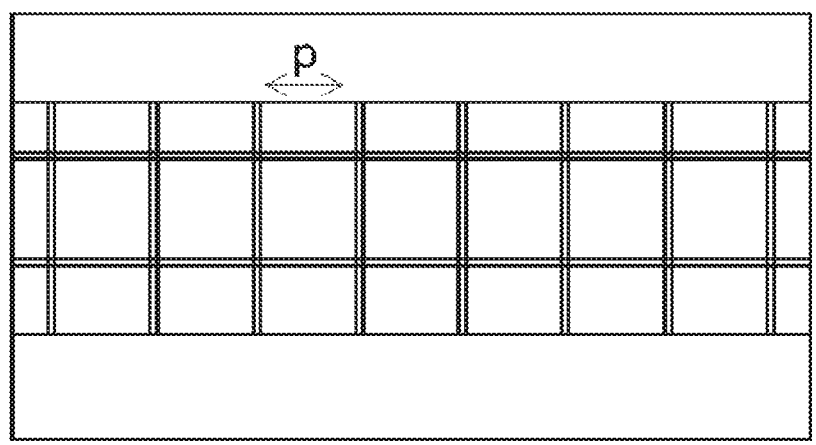
FIG. 5A is a view illustrating a long structural member of Comparative Example 1.
Figure 5B:
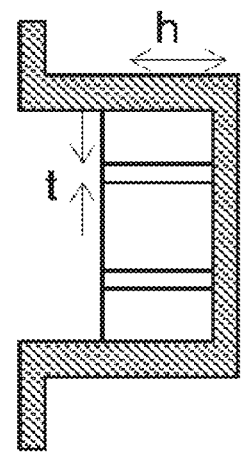
FIG. 5B is a cross-sectional view of the long structural member of FIG. 5A.

A long structural member having a thickness of 2 mm, L of 400 mm, Wa of 72.4 mm, W0 of 52.4 mm, and H0 of 25 mm was formed by the use of CAD software and ribs each having a thickness t of 2.5 mm and a height h of 10 mm were formed at the inside thereof so that two ribs were provided in the elongated direction and eight ribs were provided at a pitch p of 54.3 mm in the orthogonal direction (FIGS. 5A and 5B). After the mass of the structure member was calculated, a CAE analysis was performed to calculate a stress value and a displacement value and a mass ratio, a stress ratio, and a displacement ratio were obtained by the division of the case without the reinforcement in Example 1. As a result, Evaluation B was given in the mass ratio of 1.32, Evaluation A was given in the stress ratio of 0.99, and Evaluation B was given in the displacement ratio of 0.99.

Comparative Example 2

Figure 6A:
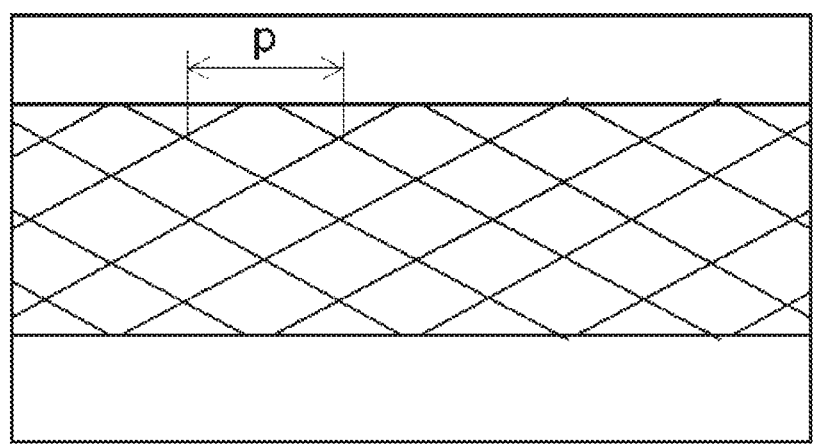
FIG. 6A is a view illustrating a long structural member of Comparative Example 2.
Figure 6B:
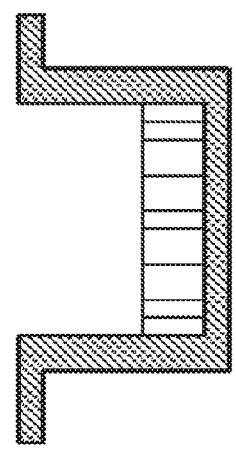
FIG. 6B is a cross-sectional view illustrating the long structural member of FIG. 6A.

A long structural member having a thickness of 2 mm, L of 400 mm, Wa of 72.4 mm, W0 of 52.4 mm, and H0 of 25 mm was formed by the use of CAD software and ribs were formed at the inside thereof so that a thickness t was 2.5 mm, a height h was 10 mm, an angle with respect to the elongated direction was 30°, and a pitch p was 54.3 mm (FIGS. 6A and 6B). After the mass of the structure member was calculated, a CAE analysis was performed to calculate a stress value and a displacement value and a mass ratio, a stress ratio, and a displacement ratio were obtained by the division of the case without the reinforcement in Example 1. As a result, Evaluation B was given in the mass ratio of 1.34, Evaluation B was given in the stress ratio of 1.05, and Evaluation B was given in the displacement ratio of 0.98.

Comparative Example 3

An evaluation was performed similarly to Comparative Example 2 except that a rib pitch p was 30 mm. As a result, Evaluation B was given in the mass ratio of 1.63, Evaluation A was given in the stress ratio of 0.78, and Evaluation A was given in the displacement ratio of 1.05.

Comparative Example 4

An evaluation was performed similarly to Example 1 except that a corner reinforcement had a width W of 10 mm and a height H of 10 mm. As a result, Evaluation B was given in the mass ratio of 1.46, Evaluation A was given in the stress ratio of 0.39, and Evaluation A was given in the displacement ratio of 1.07.

Comparative Example 5

An evaluation was performed similarly to Example 1 except that a corner reinforcement had a width W of 10 mm and a height H of 5 mm. As a result, Evaluation A was given in the mass ratio of 1.21, Evaluation B was given in the stress ratio of 2.27, and Evaluation A was given in the displacement ratio of 1.05.

Example 4

An evaluation was performed similarly to Example 1 except that a corner reinforcement had dimensions of W of 7 mm and H of 7 mm and a long side edge was formed in a circular-arc shape having a radius of 10 mm (FIG. 2). As a result, Evaluation A was given in the mass ratio of 1.14, Evaluation A was given in the stress ratio of 0.64, and Evaluation A was given in the displacement ratio of 1.06.

Example 5

A long structural member (FIG. 3) without a rib corresponding to a reinforcement countermeasure was formed to have a thickness of 2 mm, L of 400 mm, Wa of 100.0 mm, W0 of 78.1 mm, and H0 of 25 mm by the use of CAD software and flange faces of two long structural members were bonded to form a structure member (a structural member complex). After the mass of the structure member was calculated, a CAE analysis was performed to calculate a stress value and a displacement value.

Next, a long structural member having a thickness of 2 mm, L of 400 mm, Wa of 100.0 mm, W0 of 78.1 mm, and H0 of 25 mm was formed, a corner reinforcement was formed at the inside of the long structural member on the CAD so that W was 5 mm, H was 5 mm, and a long side edge was linear (FIG. 1B), and flange faces of two long structural members were bonded to form a structure member (a structural member complex) having a closed cross-sectional shape. After the mass of the structure member was calculated, a CAE analysis was performed to calculate a stress value and a displacement value and a mass ratio, a stress ratio, and a displacement ratio were obtained by the division of the case without the corner reinforcement. As a result, Evaluation A was given in the mass ratio of 1.08, Evaluation A was given in the stress ratio of 0.44, and Evaluation A was given in the displacement ratio of 1.06.

Example 6

An evaluation was performed similarly to Example 5 except that a corner reinforcement had a width W of 10 mm and a height H of 5 mm. As a result, Evaluation A was given in the mass ratio of 1.17, Evaluation A was given in the stress ratio of 0.60, and Evaluation A was given in the displacement ratio of 1.07.

Comparative Example 6

A long structural member having a thickness of 2 mm, L of 400 mm, Wa of 100.0 mm, W0 of 78.1 mm, and H0 of 25 mm was formed by the use of CAD software and ribs were formed at the inside thereof so that a thickness t was 2.5 mm, a height h was 10 mm, an angle with respect to the elongated direction was 30°, and a pitch p was 54.3 mm (FIGS. 5A and 5B). After the mass of the structure member was calculated, a CAE analysis was performed to calculate a stress value and a displacement value and a mass ratio, a stress ratio, and a displacement ratio were obtained by the division of the case without the reinforcement in Example 5. As a result, Evaluation B was given in the mass ratio of 1.46, Evaluation A was given in the stress ratio of 0.79, and Evaluation B was given in the displacement ratio of 0.97.

Comparative Example 7

An evaluation was performed similarly to Example 5 except that a corner reinforcement had a width W of 3 mm and a height H of 3 mm. As a result, Evaluation A was given in the mass ratio of 1.02, Evaluation B was given in the stress ratio of 1.44, and Evaluation A was given in the displacement ratio of 1.02.

Comparative Example 8

An evaluation was performed similarly to Example 5 except that a corner reinforcement had a width W of 10 mm and a height H of 10 mm. As a result, Evaluation B was given in the mass ratio of 1.37, Evaluation A was given in the stress ratio of 0.34, and Evaluation A was given in the displacement ratio of 1.07.

Comparative Example 9

An evaluation was performed similarly to Example 5 except that a corner reinforcement had a width W of 5 mm and a height H of 10 mm. As a result, Evaluation A was given in the mass ratio of 1.17, Evaluation B was given in the stress ratio of 1.02, and Evaluation A was given in the displacement ratio of 1.08.

Example 7

A long structural member (FIG. 3) without a rib corresponding to a reinforcement countermeasure was formed to have a thickness of 2 mm, L of 400 mm, Wa of 72.4 mm, W0 of 52.4 mm, and H0 of 50 mm by the use of CAD software and flange faces of two long structural members were bonded to form a structure member (a structural member complex) having a closed cross-sectional shape. After the mass of the structure member was calculated, a CAE analysis was performed to calculate a stress value and a displacement value.

Next, a hat channel having a thickness of 2 mm, L of 400 mm, Wa of 72.4 mm, W0 of 52.4 mm, and H0 of 50 mm was formed, a corner reinforcement was formed at the inside of the hat channel on the CAD so that W was 10 mm, H was 7.5 mm, and a long side edge was linear (FIG. 1B), and flange faces of two long structural members were bonded to form a structure member. After the mass of the structure member was calculated, a CAE analysis was performed to calculate a stress value and a displacement value and a mass ratio, a stress ratio, and a displacement ratio were obtained by the division of the case without the corner reinforcement.

As a result, Evaluation A was given in the mass ratio of 1.25, Evaluation A was given in the stress ratio of 0.15, and Evaluation A was given in the displacement ratio of 1.12.

Comparative Example 10

A long structural member having a thickness of 2 mm, L of 400 mm, Wa of 72.4 mm, W0 of 52.4 mm, and H0 of 50 mm was formed by the use of CAD software and ribs were formed at the inside thereof so that a thickness t was 2.5 mm, a height h was 10 mm, an angle with respect to the elongated direction was 30°, and a pitch p was 54.3 mm (FIG. 5A, 5B). After the mass of the structure member was calculated, a CAE analysis was performed to calculate a stress value and a displacement value and a mass ratio, a stress ratio, and a displacement ratio were obtained by the division of the case without the reinforcement in Example 1. As a result, Evaluation A was given in the mass ratio of 1.28, Evaluation A was given in the stress ratio of 0.60, and Evaluation B was given in the displacement ratio of 0.98.

Comparative Example 11

An evaluation was performed similarly to Example 5 except that a corner reinforcement had a width W of 10 mm and a height H of 20 mm. As a result, Evaluation B was given in the mass ratio of 1.69, Evaluation A was given in the stress ratio of 0.21, and Evaluation A was given in the displacement ratio of 1.15.

EXPLANATIONS OF LETTERS OR NUMERALS

1: linear corner of elongated member
2: circular-arc corner of elongated member
3: bottom face
4: upright face
5: both end portions of elongated main body
6: pair of flanges extending from both end portions in longitudinal direction
7: maximal stress extraction point
8: displacement extraction point

The invention claimed is:

1. A structural member complex, comprising a first structural member and a second structural member each of the first and second structural members comprise a hat channel structure with U-shaped longitudinal cross-section comprising two opposed upright faces each face having an inner surface, an outer surface, an upper end portion and a bottom end portion and each of the two opposed upright faces are connected by the bottom end portion opposite of the upper end portion wherein corners are formed at each of the intersections of the bottom end portion that connects the two upright faces, and flanges, wherein the two opposed upright faces are not connected at any portion other than at the corners formed at each intersection of the bottom end portion that connects the two upright faces, and wherein the corners inside the U-shaped portion are reinforced by fiber reinforcement resin and a cross-section of each of two

TABLE 1

| | W0 | H0 | W | H | Mass ratio | Stress ratio | Displacement ratio | W/W0 | H/H0 | Remark |
|---|---|---|---|---|---|---|---|---|---|---|
| Example 1 | 52.4 | 25 | 7 | 7 | A (1.22) | A (0.87) | A (1.07) | 0.134 | 0.280 | |
| Example 2 | 52.4 | 25 | 5 | 5 | A (1.1) | A (0.98) | A (1.05) | 0.095 | 0.200 | |
| Example 3 | 52.4 | 25 | 5 | 9 | A (1.21) | A (0.99) | A (1.06) | 0.095 | 0.360 | |
| Comparative Example 1 | 52.4 | 25 | — | — | B (1.32) | A (0.99) | B (0.99) | — | — | Rib |
| Comparative Example 2 | 52.4 | 25 | — | — | B (1.34) | B (1.05) | B (0.98) | — | — | Rib |
| Comparative Example 3 | 52.4 | 25 | — | — | B (1.63) | A (0.78) | A (1.05) | — | — | |
| Comparative Example 4 | 52.4 | 25 | 10 | 10 | B (1.46) | A (0.39) | A (1.07) | 0.191 | 0.400 | |
| Comparative Example 5 | 52.4 | 25 | 10 | 5 | A (1.21) | B (2.27) | A (1.05) | 0.191 | 0.200 | |
| Example 4 | 52.4 | 25 | 7 | 7 | A (1.14) | A (0.64) | A (1.06) | 0.134 | 0.280 | Circular-arc |
| Example 5 | 78.1 | 25 | 5 | 5 | A (1.08) | A (0.44) | A (1.06) | 0.064 | 0.200 | |
| Example 6 | 78.1 | 25 | 10 | 5 | A (1.17) | A (0.6) | A (1.07) | 0.128 | 0.200 | |
| Comparative Example 6 | 78.1 | 25 | — | — | B (1.46) | A (0.79) | B (0.97) | — | — | Rib |
| Comparative Example 7 | 78.1 | 25 | 3 | 3 | A (1.02) | B (1.44) | A (1.03) | 0.038 | 0.120 | |
| Comparative Example 8 | 78.1 | 25 | 10 | 10 | B (1.37) | A (0.34) | A (1.07) | 0.128 | 0.400 | |
| Comparative Example 9 | 78.1 | 25 | 5 | 10 | A (1.17) | B (1.02) | A (1.08) | 0.064 | 0.400 | |
| Example 7 | 52.4 | 50 | 10 | 7.5 | A (1.25) | A (0.15) | A (1.12) | 0.191 | 0.150 | |
| Comparative Example 10 | 52.4 | 50 | — | — | A (1.28) | A (0.6) | B (0.98) | — | — | Rib |
| Comparative Example 11 | 52.4 | 50 | 10 | 20 | B (1.69) | A (0.21) | A (1.15) | 0.191 | 0.400 | |

INDUSTRIAL APPLICABILITY

According to the invention, it is possible to provide a fiber reinforcement resin structure member having a simple reinforcement structure and exhibiting high mechanical characteristics including a bending strength or a flexural modulus while suppressing an increase in molded article weight.

corners inside the reinforced U-shaped portion is a triangular cross-section satisfying the following equations:

$0.05 \leq W/W0 \leq 0.15$ $0.15 \leq W/H0 \leq 0.36$, wherein

W0 indicates an outer face length of a bottom face portion of the U-shaped portion of the longitudinal cross-section, W indicates an inner face length of the bottom face portion of the U-shaped portion of the inner corner of the reinforced U-shaped portion of the longitudinal cross-section, H0 indicates an outer face length of the upright face portion of the U-shaped portion of the longitudinal cross-section, H indicates an inner face length of the upright face portion of the U-shaped portion of the inner corner of the reinforced U-shaped portion of the longitudinal cross-section, wherein a closed cross-sectional shape is formed by bonding each of the end portions extending in a longitudinal direction of the first structural member to the corresponding end portion extending in a longitudinal direction of the second structural member, and wherein the flanges are projected outward.

2. The structural member complex according to claim 1, wherein a side edge facing the inside of the U-shaped portion in the cross-section of each of the two corners is linear.

3. The structural member complex according to claim 1, wherein matrix resin forming the fiber reinforcement resin is thermoplastic resin.

4. The structural member complex according to claim 1, wherein matrix resin forming the fiber reinforcement resin is thermosetting resin.

5. The structural member complex according to claim 1, wherein reinforcement fiber forming the fiber reinforcement resin is carbon fiber or glass fiber.

6. The structural member complex according to claim 1, wherein $$0.06 \leq W/W0 \leq 0.14$$

$$0.16 \leq H/H0 \leq 0.35.$$

7. The structural member complex according to claim 1, wherein
W0 is from 10 to 500 mm,
H0 is from 5 to 300 mm,
W is from 1.0 to 75 mm, and
H is from 1.0 to 100 mm.

8. The structural member complex according to claim 1, which resists bending deformation.

9. The structural member complex according to claim 1, wherein the flanges are projected outward at a right angle relative to the two upright faces.

* * * * *